United States Patent [19]

Durkin

[11] Patent Number: 4,650,381

[45] Date of Patent: Mar. 17, 1987

[54] TRAILER CHASSIS ASSEMBLY FOR HOLDING STACKED CHASSIS

[76] Inventor: Robert O. Durkin, 1735 Twentieth St., N.W., Washington, D.C. 20009

[21] Appl. No.: 760,580

[22] Filed: Jul. 30, 1985

[51] Int. Cl.[4] .......................... B65D 88/12; B60P 3/07
[52] U.S. Cl. ........................................ 410/43; 410/31; 410/56; 410/82; 206/509; 206/511; 206/512; 220/1.5
[58] Field of Search .................. 410/3, 4, 7, 24, 26, 410/31, 32, 34, 35, 43, 46, 56, 57, 66, 71, 76, 77, 78, 82; 206/335, 526, 509, 511, 512; 296/181, 204, 26; 220/1.5, 8, 23.4, 23.6; 105/393

[56] References Cited

U.S. PATENT DOCUMENTS

| | | | |
|---|---|---|---|
| 2,413,404 | 12/1946 | Black | 206/335 X |
| 2,461,577 | 2/1949 | Stark, Jr. | 296/26 X |
| 2,932,261 | 4/1960 | Kersh | 410/34 |
| 3,048,437 | 8/1962 | Linder | 410/4 |
| 3,830,381 | 8/1974 | Bodenheimer et al. | 220/8 X |
| 4,180,172 | 12/1979 | Torneback | 105/393 X |

FOREIGN PATENT DOCUMENTS

| | | | |
|---|---|---|---|
| 56-01997 | 7/1981 | Japan | 410/24 |
| 1298035 | 11/1972 | United Kingdom | 410/76 |
| 0870257 | 10/1981 | U.S.S.R. | 220/1.5 |

Primary Examiner—Robert B. Reeves
Assistant Examiner—Scott H. Werny
Attorney, Agent, or Firm—John S. Hale

[57] ABSTRACT

The present invention is directed towards a container for the handling of truck-trailer chassis in overland and marine transportation. The container is capable of being stacked with other containers and is provided with front and rear endframes, removably secured to front and rear bolsters of the interlocking container chassis frame, which hold a stack of chassis of same or different lengths, in place for shipping. Strong points provided at the corners of the front and rear end endframes facilitating handling and allowing for the securement of the container to overland transportation vehicles and when stowed above deck on marine vessels through the use of conventional securement devices.

12 Claims, 26 Drawing Figures

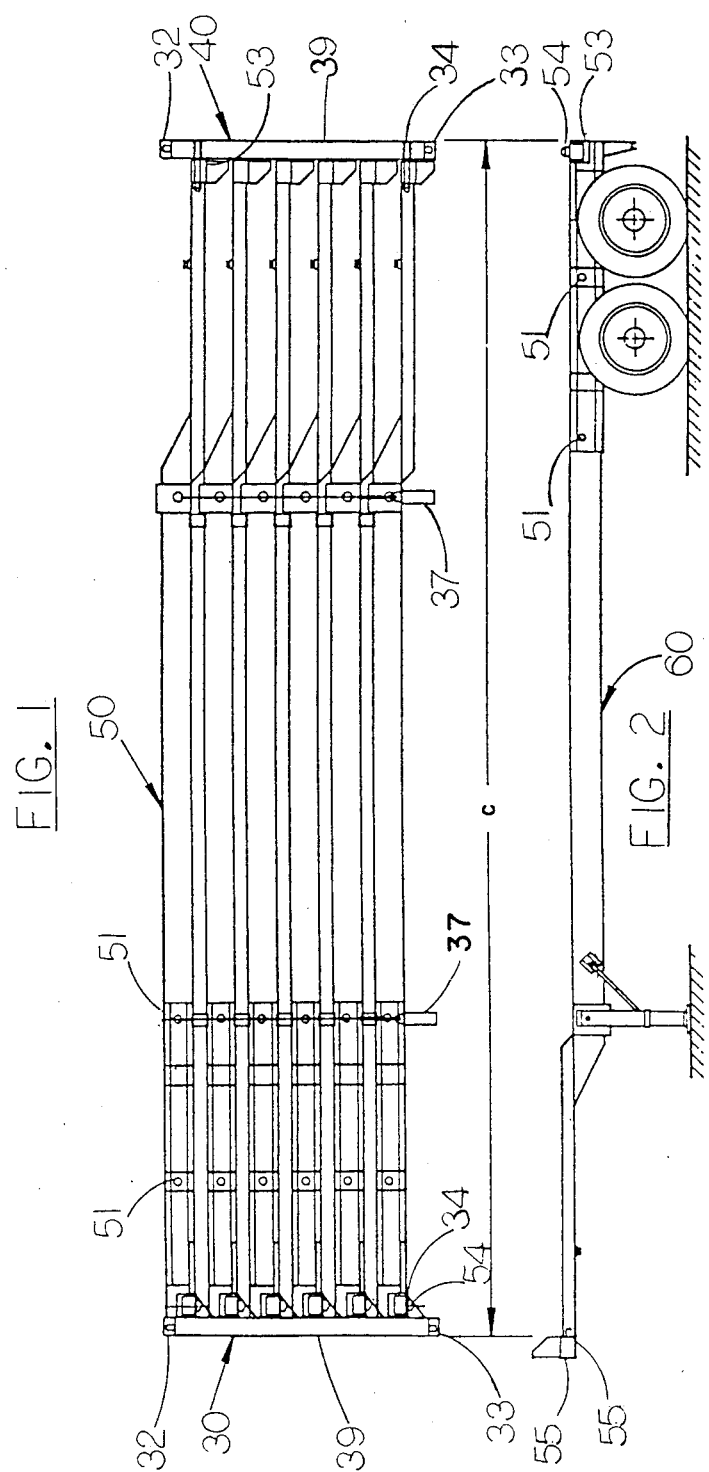

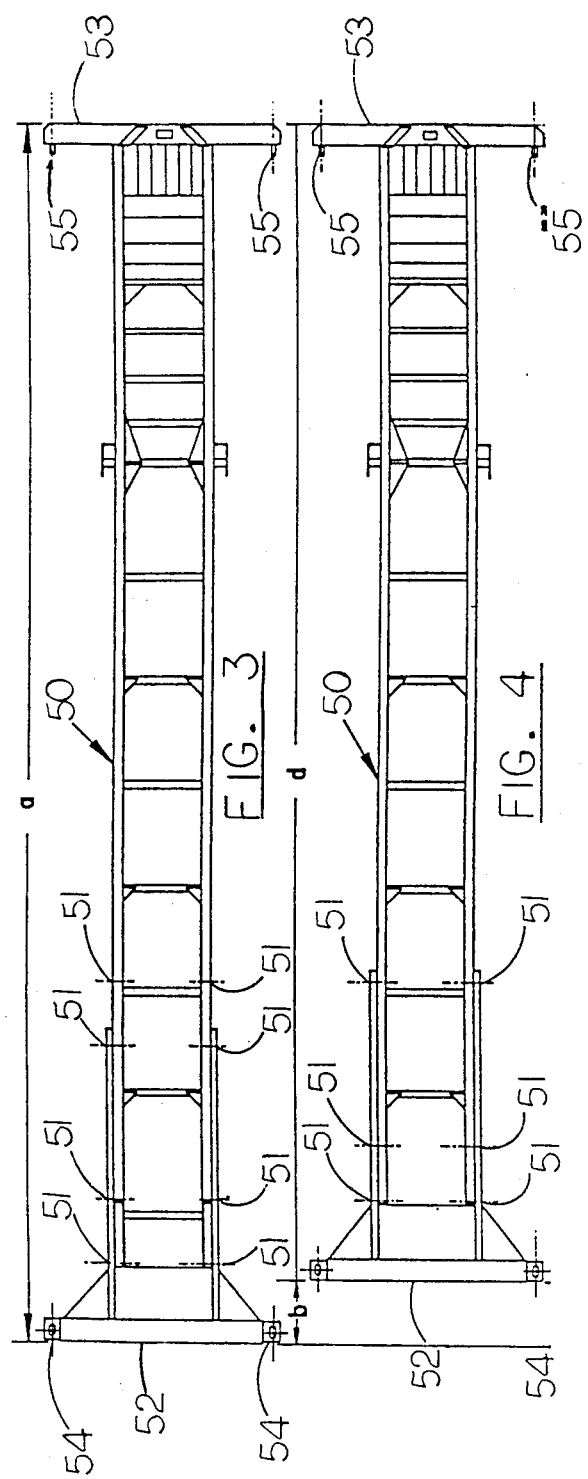

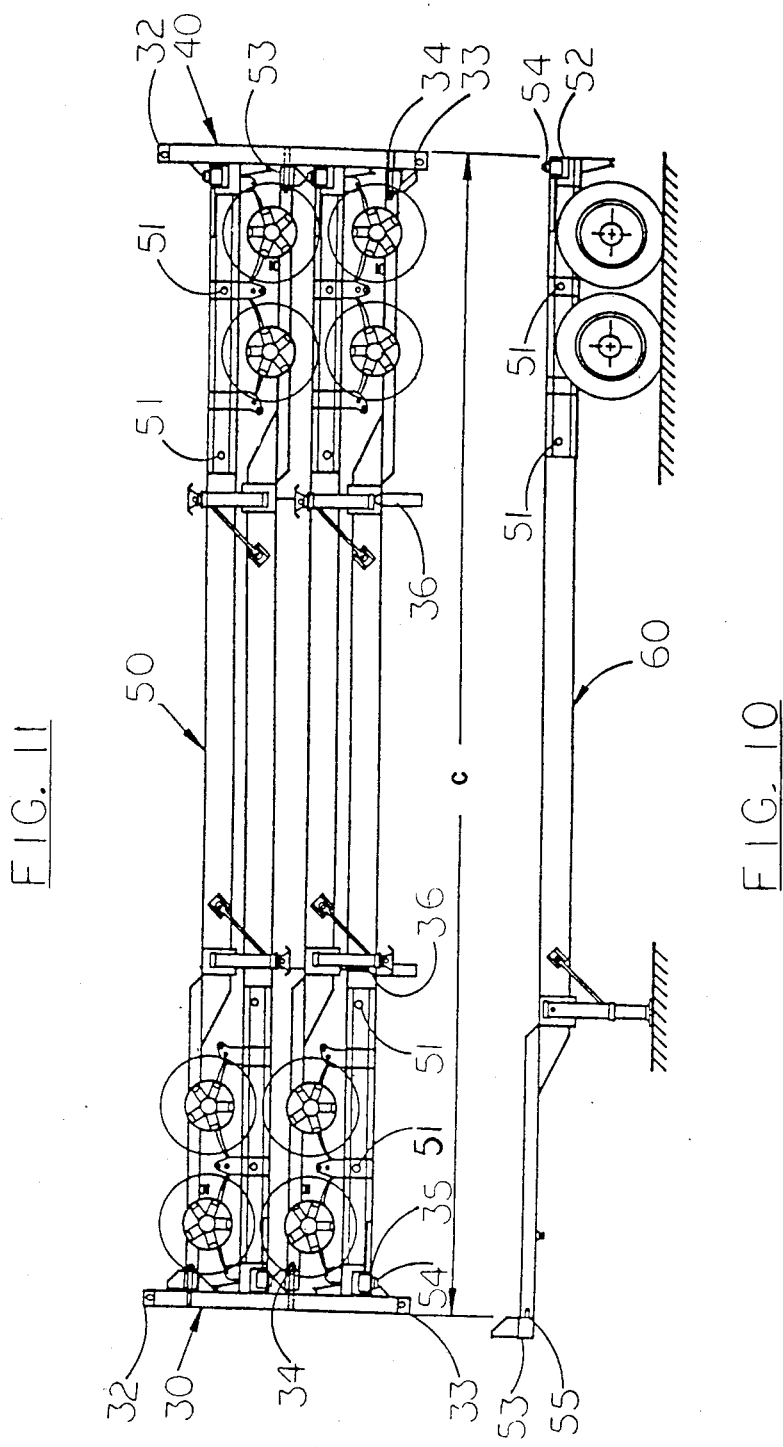

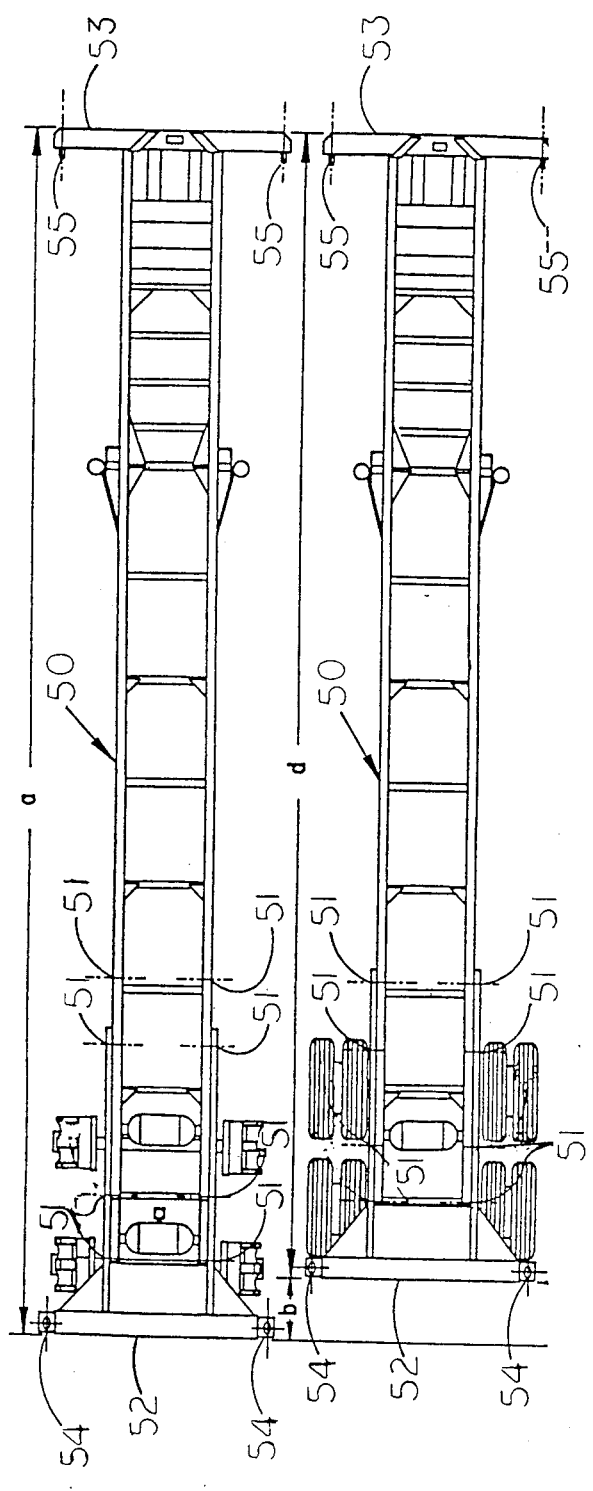

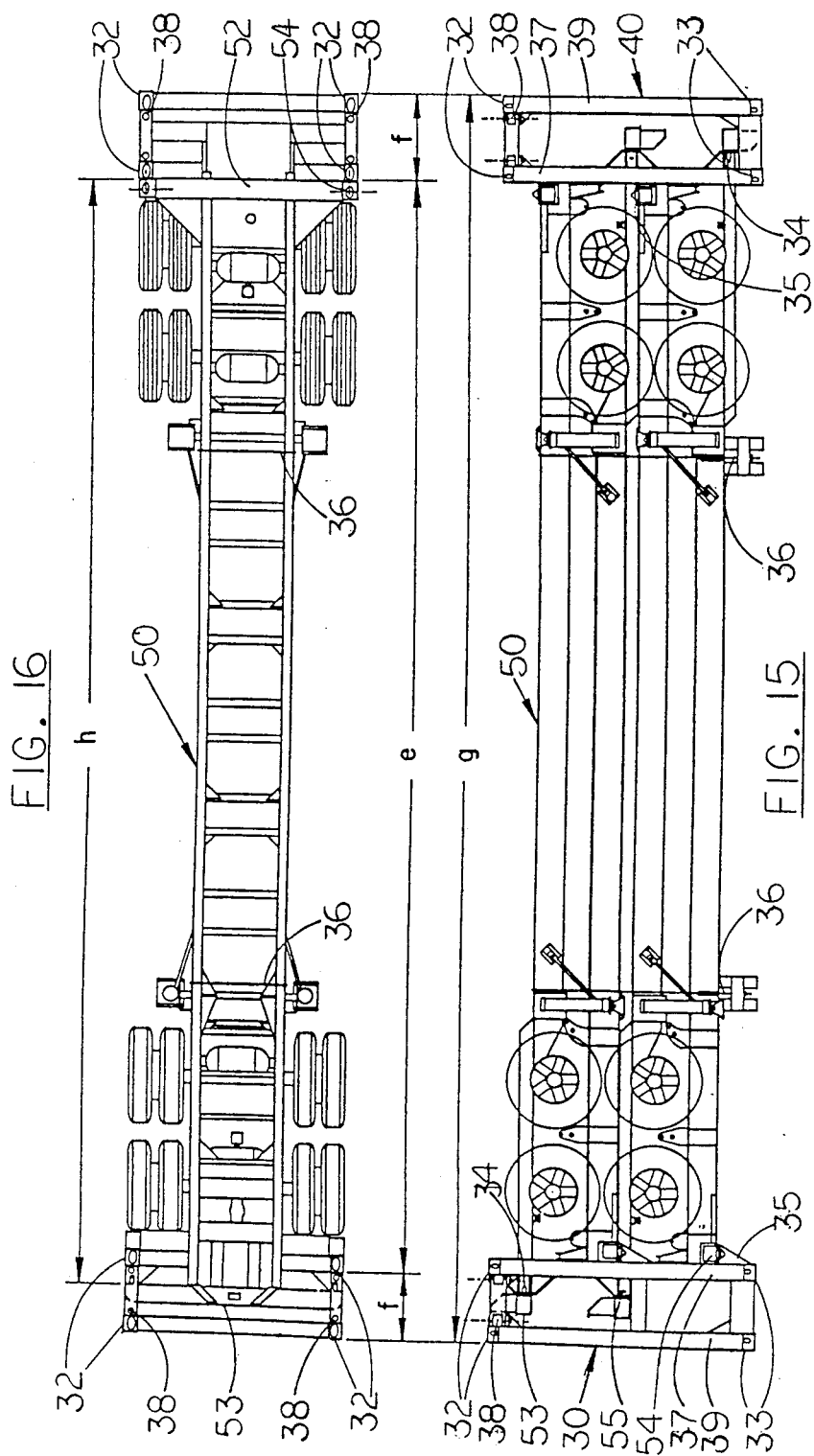

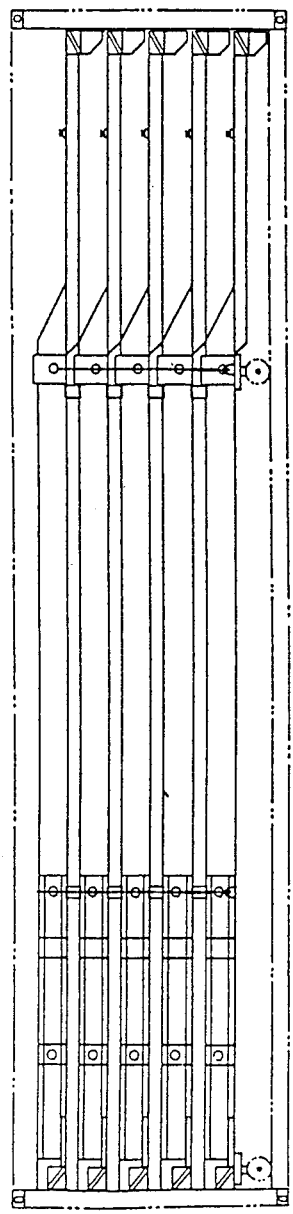
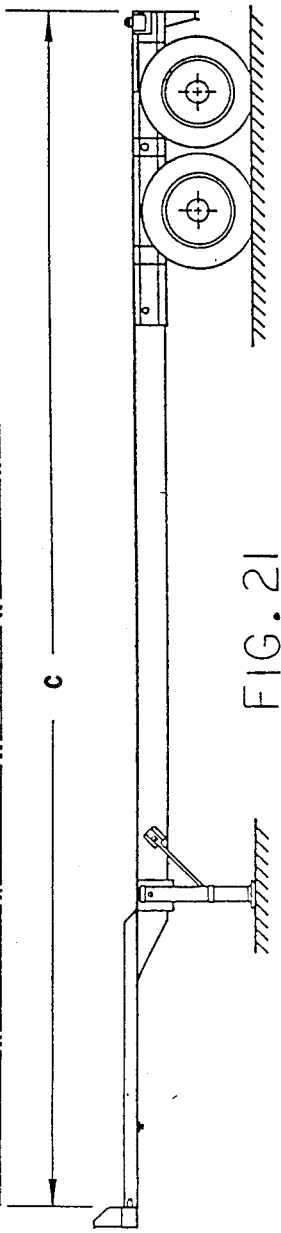
FIG. 22
FIG. 21

TRAILER CHASSIS ASSEMBLY FOR HOLDING STACKED CHASSIS

BACKGROUND OF THE INVENTION

The invention generally relates to the handling of freight in combined overland and marine transportation and is specifically directed to freight container adapted to be mounted on highway truck-trailer chassis, railroad flat cars or the like and stowed aboard ship. Freight containers which are capable of being stacked in a superimposed relation are known in the prior art specifically to fill the hold and increase deck storage of large sea going vessels. Examples of such containers are disclosed by U.S. Pat. Nos. 3,044,653 and 3,085,703. Containers of this type are provided with heavy steel or aluminum castings at each of the four front corners of the container and rear corners of the container. Each corner of the container is provided with a corner post connected between associated pairs of upper and lower steel castings which comprise the load bearing members of the containers. Conventional openings in each of the steel castings facilitate the interlocking of the container with suitable lifting means for transferring the container from a land vehicle to a ship and vice versa, as well as to facilitate the positioning and securing together of containers in a stacked relation. The corner castings are so related to the corner post and to the top, side, and end walls that the container may be stacked one on another with all of the load taken by the corner castings and corner posts.

Another container for handling freight is shown by U.S. Pat. No. 3,646,609. This reference provides for the stacking of conventional containers of varied size in superimposed relation. The container is constructed with front and sidewalls formed of metal panels.

The disclosed prior art containers necessitate the use of a three dimensional box shaped structure of continuous framing for purposes of handling freight. Since the freight is of substantial weight and size, it requires a box shaped container of sufficient strength and rigidity. The prior art container is an independent free-standing structure which makes no use of the freight to contribute to the container framing or structure.

The conventional container chassis and chassis frame are of lengths greater than the container frame for freight handling and of widths equal to that of the container frame. Thus the shipping and loading of a fully assembled container chassis or frame is not easily accomplished unless the chassis frame is disassembled and packaged or otherwise shipped via general cargo ship and not onboard a standard container ship as containerized freight or alternatively transported on highway vehicles as containerized freight.

Off-shore manufacturers of chassis have for some time been exporting chassis from their countries by general cargo (bulk) ships to the United States and other territories. Of course this involves some freight charge, normally charged per cubic meter (CBM). For example, skeletal steel chassis frames shipped by general cargo vessel from Korea, landing on the west coast of the United States at most favorable special CBM rates cost approximately U.S. $150 per/unit minimum, and may be as high as U.S. $280/unit. Additional costs are involved for dockside handling, in-land transportation, cargo damage, etc. Moreover, the chassis are not shipped as fully assembled, requiring additional work to be performed in the U.S. at U.S. labor rates. More importantly, the largest market for chassis sales is the U.S. east coast, but the availability of general cargo ships for east coast discharge is limited, and transit times and freight rates are prohibitive.

By providing the chassis to the buyers, ship operators, as containerized freight, all of the forementioned costs can be defrayed. The container ship operator can reposition its chassis throughout the world as "non-revenue freight, company business".

SUMMARY OF THE INVENTION

The present invention relates to a shipment of container chassis and skeletal steel frames of various overall lengths.

Chassis manufacturing in the United States has traditionally been a regional sales oriented business because of the high cost of over-land freight to delivery points desired by the buyers. By containerizing the chassis, the manufacturer can expand the region of its sales, using (A) the more economical rail rates and systems, and (B) shipping chassis frames throughout the United States or other territories to regionally located, low overhead facilities or sub-contractors for final assembly of regionally sourced components such as running gear and landing gear. For example, there is on average a 28% savings in transport using COFC Rail from the west coast to the east coast vs line-haul by tractor.

For the fleet operator of chassis, the invention provides the ability to reposition their chassis throughout the territory or overseas as containerized freight. Container chassis' frames of various overall lengths have a variable length wheel base which is provided by translating a frame section at the rear of the chassis skeletal steel frame, allowing the wheelbase as measured from the centerline of the king-pin to the center of the chassis axles to vary. Each container chassis has translating rear bolster and releasably attached rear twist lock and front bolster end assemblies providing for a reduced overall length and width in order to facilitate the shipment of the container as containerized freight.

A conventional container chassis having a tare weight of approximately 6500 pounds is designed with a skeletal steel frame having a tare weight of approximately 3500 pounds. This steel frame, when simply supported at the chassis king-pin and over the center of the running gear, has the structural integrity to withstand the static and dynamic forces imposed by a container of gross weight of 67,200 lbs. The front and rear bolster assemblies of the chassis are designed with sufficient strength to resist the vertical, horizontal, transverse and torsional forces imposed by 67,200 pound containers in service.

Therefore, it is clearly economical and desirable to make use of the chassis frames strength to build and frame a container.

Since containers have specifications for certain design and dimensional criteria promulgated by I.S.O., A.N.S.I. and other organizations, the invention identifies and makes use of these features to stack chassis and frame a container. The constant features are: (1) rear twistlocks set at 89 inch centers, (2) front pins set at 89 inch centers, (3) an offset of 4¾ inches between main beam and gooseneck beam, and (4) somewhat standard general construction plan. By securing the front and rear bolsters to releasably attached endframes, the strength of the chassis frames is used to resist lateral and longitudinal racking loads on a container.

Chassis generally use beams for their main frames which are about 12 inches deep. By stacking these beams and tensioning the stack with turn buckles or other suitable means, the moment of inertia of the stack of beams, is greatly increasd acting simultaneously vis-a-vis individually, to reduce beam deflection to a minimum.

While the invention specifically relates to a conventional forty foot container chassis, it is to be understood that any specific chassis length, as for example, two twenty foot chassis in place of one forty foot chassis, or a forty five or forty eight foot chassis in place of forty foot chassis could be easily adapted for shipment as containerized freight.

Another feature of the invention provides the ability to easily and economically convert standard 96 inch wide chassis to 102 inch width; also, to quickly perform maintenance on damaged front pins and rear twistlocks of chassis. The later feature has significant value to fleet operators which have the ultimate goal of 100% equipment utilization.

The corner support points and any intermediate support points of container in the present invention are sufficiently strong to support a plurality of containers in superimposed relation. Conventional openings are provided in each of the support points to facilitate the locking and the lifting of the container with conventional lifting means and for transferring the container.

The containers of the invention are capable of transporting stacks of container chassis where the container for transport is itself capable of being stacked interchangeably in various loading arrangements with other containers of equal, greater or shorter length. Intermediate support points are spaced to coincide with the corner posts of a container of shorter length or the corner support points coincide with the corner supports of other containers of equal length. In this manner, the load path for a stacked series of containers may be either at the end corner support points or any intermediate support points depending upon the respective lengths of the stacked containers. Since a stack of containers would have a common load path, a conventional spreader mechanism, such as that disclosed by U.S. Pat. No. 3,042,227, which has relatively fixed pick up points and is designed for lifting the shortest or longest containers in a prescribed container stack, can be utilized for transferring, stacking or unstacking single or mixed length containers.

The present invention provides a stack of container chassis which form a container capable of being hoisted between land vehicles and marine vessels by existing transferring apparatus and lifting systems and is capable of being stacked in engaged superimposed relationship on one another.

One feature of the invention is the stacking of container chassis and the use of the container chassis' freight as a rigid transverse and longitudinal member to join together front and rear endframe and thereby frame a special container for freight handling.

Another feature of the invention is the provision of the translation of the rear bolster and rear twistlock assembly to provide a reduced overall container chassis length to facilitate the stacking of container chassis within the conventional lengths prescribed for freight containers, for example 40 or 45 foot containers.

Another feature of the invention is the use of conventional container chassis rear twistlock devices and front pin locking devices to facilitate the stacking and engagement of container chassis to the front and rear endframe assemblies so as to frame the container for freight handling.

Yet another feature of the invention is the use of pin locating locking devices of conventional sliding type of translating container chassis tandem axle slider apparatus to facilitate the engagement of the container chassis skeletal frame in a position of reduced overall length, so as to fit the stack of container chassis within the conventional lengths prescribed for freight containers.

Another feature of the invention is the rotation of the container chassis rear stepguard or "ICC Bumper" into a position of reduced elevation for shipment, so as to be releasably secured for shipment and to facilitate the stacking of container chassis in superimposed relation.

Still another feature of the invention is the provision of reducing the overall width of the container chassis at the front and rear bolster assemblies, and the releasability of the container chassis front locking pins and rear twistlock devices so as to reduce the overall width of the container chassis for shipment within the conventional widths prescribed for freight containers or within freight containers of conventional types. It is to be understood that while this invention relates to prescribed widths of conventional containers existing at the time of application, that containers and chassis of any width, for example 102 inch width instead of 96 inch width, could be equally well adapted for stacking and shipment as containerized freight, and that the releasably attached rear twistlocks and front bolster ends could be adapted to facilitate the use of one container chassis or container which would accommodate both widths, for example 96 inch and 102 inch width.

Another feature of the invention is the provision of removable front and rear endframes having support points at the four corners, top and bottom, of the container endframes, for alignment with support points of a container of substantially equal length and intermediate support points, at the top and bottom of the container endframes spaced sufficiently to align with the support points of a container of shorter length so as to be releasably secured thereto in stacked relationship.

While this invention relates specifically to the handling of container chassis in successive overland and marine transportation, it is to be understood that many other types of commodities could be equally well adapted for stacking and/or transport, as the truck-trailers disclosed above, for example pressure vessels or other fabricated structural steel members or apparatus.

These and other objects and advantages of the present invention will be more fully appreciated by reference to the following discussion of the invention when read in conjunction with the accompanying drawings.

BRIEF DESCRIPTION OF THE DRAWINGS

FIG. 1 is a side elevation of the elongated container for handling chassis frames;

FIG. 2 is a side elevation of the elongated container chassis fully assembled with tires;

FIG. 3 is a top plan view of the container chassis skeletal steel frame illustrating the front and rear bolster assemblies, front pin and rear twistlock area and translating provision for the rear bolster assembly;

FIG. 4 is a top plan view of the container chassis of FIG. 3 with the rear bolster translated to a position reducing overall length of the chassis for handling;

FIG. 10 is a side elevation of the elongated container chassis fully assembled with tires;

FIG. 11 is a side elevation of the elongated container for handling fully assembled chassis with tires;.

FIG. 12 is a top plan view of the container chassis fully assembled including axles, wheels, drums and landing gear, without tires;

FIG. 13 is a top plan view of the container chassis with the rear bolster translated to a position reducing overall length of the fully assembled chassis, including tires;

FIG. 15 is a side elevation of the side of the elongated container with intermediate support points, for handling of fully assembled chassis;

FIG. 16 is a top plan view of the container with intermediate support points;

FIG. 21 is a side elevation of the elongated side of the container chassis, fully assembled with tires;

FIG. 22 is a side elevation of the elongated side of a stack of chassis frames positioned inside a conventional container for freight handling;

DETAILED DESCRIPTION OF THE INVENTION

Figure 19:
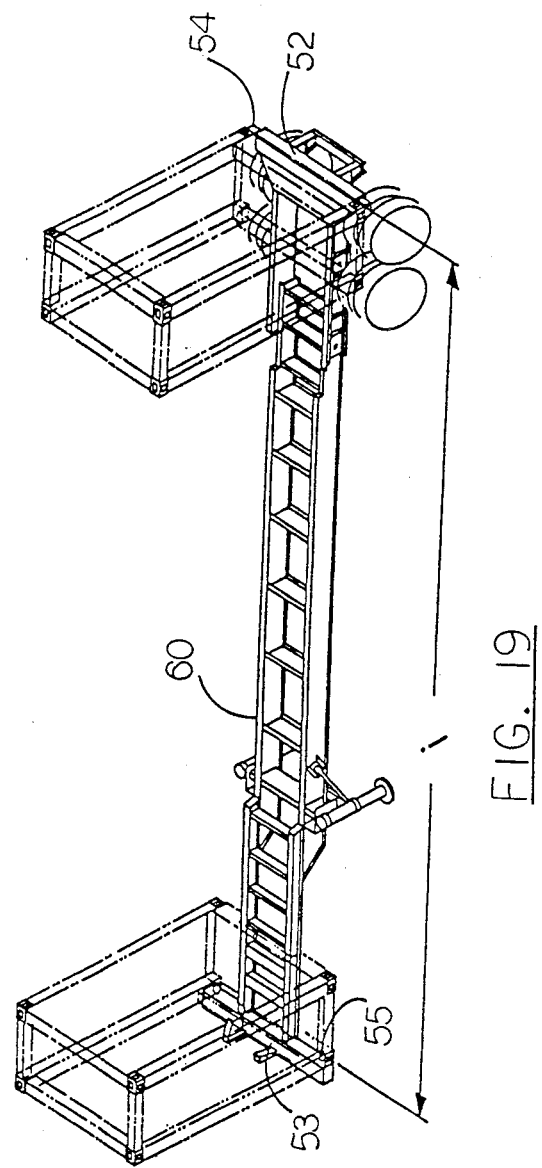
FIG. 19 is an isometric view of the container with intermediate support points for handling chassis and positioning of the container atop a container chassis the front endframe and rear endframe in phantom.
Figure 20:
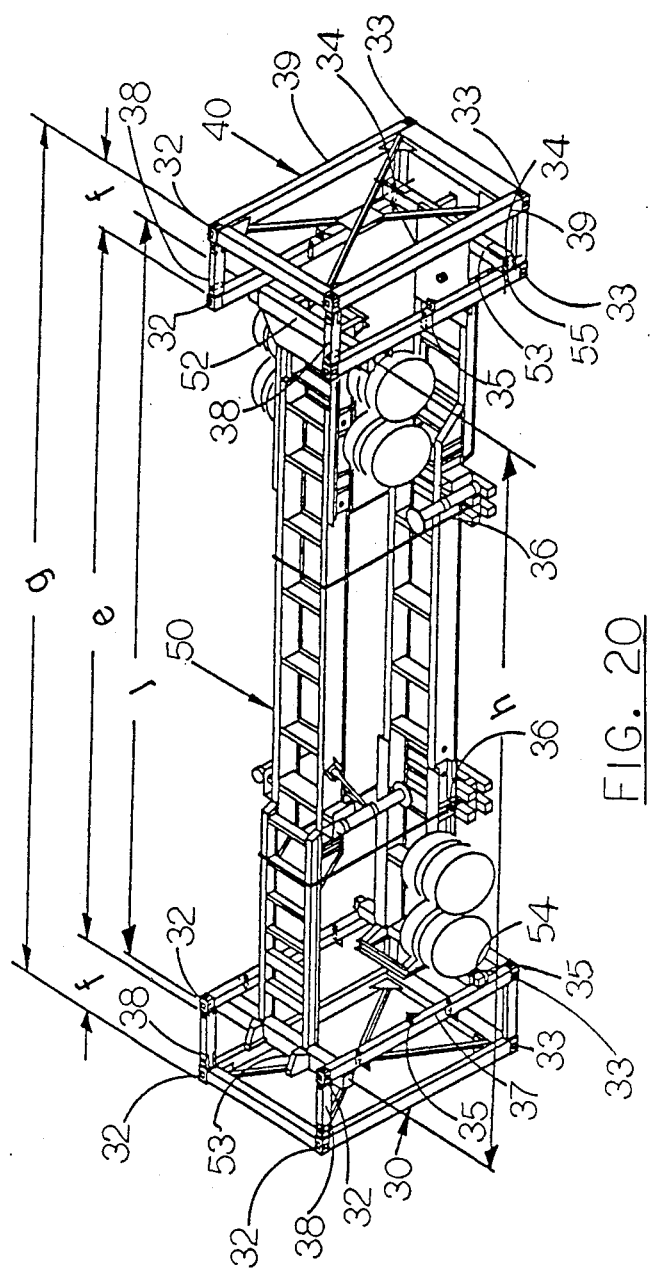
FIG. 20 is an isometric view of the container with intermediate support points with two chassis.
Figure 26:
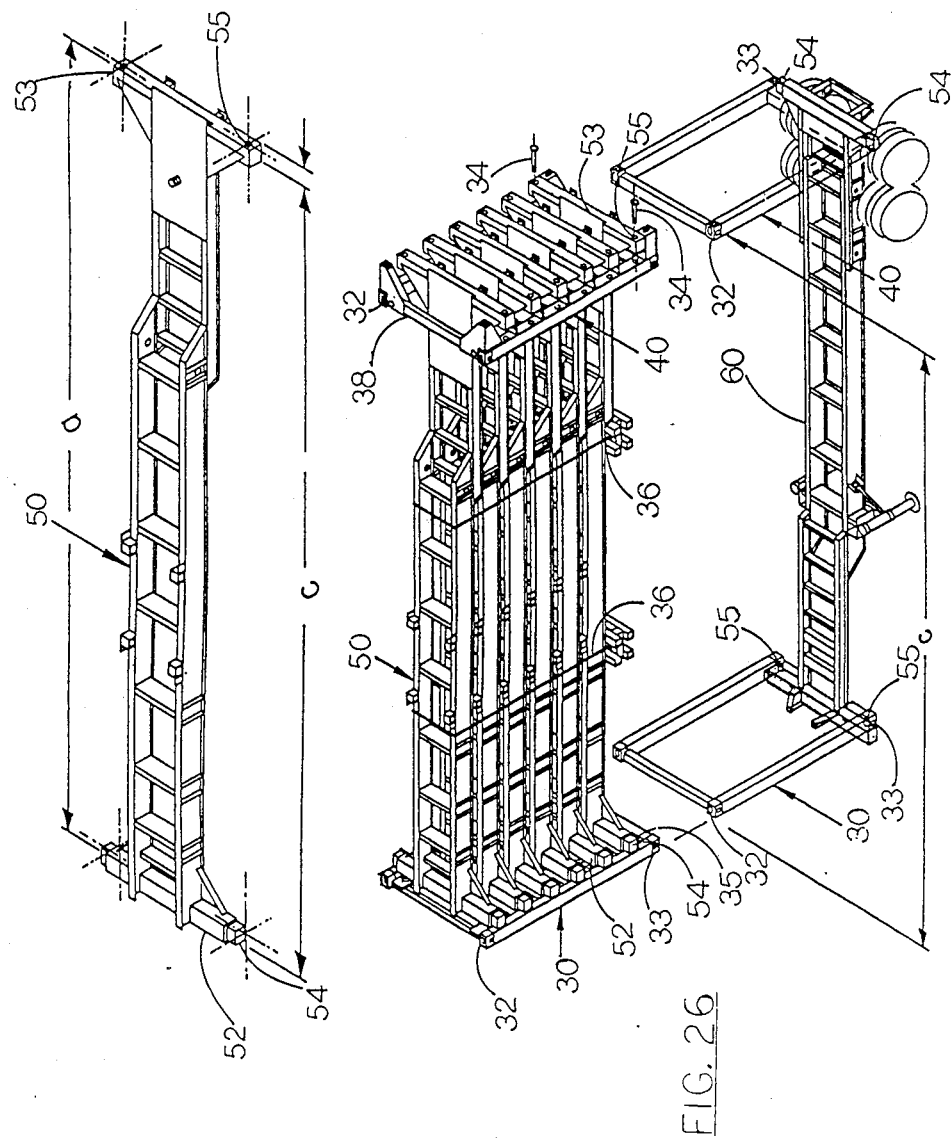
FIG. 26 is an isometric view of a stack of container chassis frames of fixed overall length with a stackable chassis and base chassis with phantom front and rear endframe and tires exploded for purposes of comparison, framing a container capable of being stowed above deck or positioned atop a container chassis for overland transport.

The preferred embodiment and best mode of the invention is shown in FIGS. 1 to 14. In the drawings the numeral 30 designates generally a front end frame assembly and the numeral 40 designates generally a rear end frame assembly comprising a pair of end posts ("corner posts") 39, interconnected by sills and by header bars 38. The header bars 38 may be fixed securely by welding or other suitable means, or the header bars 38 may be releasable through pins 34 or otherwise connected as shown in FIGS. 19 and 26. The front end frame assembly 30 and rear end frame assembly 40 are connected to the front and rear bolster assemblies 53 and 52 of the container chassis 50. Unlike prior art containers the chassis are in fact the freight to be handled, thereby framing and forming a cargo container for transporting cargo on container ships, on a truck-trailer chassis 60, railway flatcars, etc. The container chassis frames are well known in the art and available for purchase from Fruehauf U.S.A., Trailmobile, a division of the Pullman Company, Strick Corporation and Dorsey Corporation to name a few manufacturers. Therefore, construction of the chassis frames need not be described in this specification.

The chassis freight may be connected to front and rear end frames, making use of the conventional chassis rear twistlock assemblies 54 and front pin assemblies 55 to secure the chassis rear bolster 52 and front bolster 53 to the end frames 30 and 40. Conventional means known in the art is that shown in U.S. Pat. Nos. 4,486,132 and 4,459,072. The chassis front and rear bolster assemblies are of sufficient strength so as to provide the necessary transverse rigidity, lateral stability and longitudinal restraint to frame the container. Preferably the rear twistlock assembly and front pin assembly 120 are removably secured to the front and rear bolster assembly so that they can be added or removed as desired. The use of keys and keyways can be used to accomplish this selective connection.

In order to support the weight of a plurality of superimposed containers and to transfer that load to the corner post of the container beneath or other support on board ship, railcar or the like, cornerposts 39 and corner castings 32 and 33 are provided, similar to those disclosed in U.S. Pat. Nos. 3,042,227, 3,085,703 and 3,044,653. Each of the cornerposts 39 have upper corner castings 32 and lower corner castings 33 welded or otherwise suitably attached thereto at each end, and are of sufficient strength to support the load imposed by the freight and simultaneously to support a plurality of containers thereabove. Each of the top castings 32 and bottom castings 33 has an oblong slot opening or socket defined therein of a conventional shape and size as regulated by the International Standards Organization formed to receive a conventional coupling mechanism, not shown but well known in the art, for lifting the container by spreader bar or slings. The top and bottom castings are also used to secure the container to deck sockets on board ships, to adjacent containers above or below, and atop railway flatcars.

The end frames 30 and 40 may be constructed with one set of corner posts 39 as shown in FIGS. 1, 5, 6, 9, 11 and 26, or alternatively may be constructed with more than one set of posts as shown in FIGS. 15 through 20, in which case intermediate support posts 37 are provided and spaced such that the distance between the front intermediate and rear intermediate support posts is compatible with containers of conventional lengths. By providing intermediate sets of support posts 37, it is possible to transport container chassis of conventional lengths, for example approximately 40 feet long, without providing special design features within the chassis to effectively reduce the overall length of the chassis for shipment as containerized freight of some conventional size container. By providing end plates or corner castings 32 and 33 having oblong slot openings or sockets therein of conventional shape and size, fixed to the top and bottom of the intermediate support post, it is possible to handle, stack, secure, couple and otherwise transport the freight and container using all conventional means of handling and shipping containers of a size (length) approximately the same as the distance between the front intermediate and rear intermediate supports 37.

Referring to FIGS. 14–16 and 19; "e" or elongation represents the 40 foot distance between support points at the corner posts of a conventional 40 foot long container, for connection at the intermediate support posts 37 of of the chassis transport container. In the same FIGS. "f" represents the distance or spacing between intermediate support posts 37 and the ends of a container of greater length, terminating at the outside face of corner posts 39. The overall length of some larger container, for example 45 or 48 foot long, is represented by the letter "g". In a preferred embodiment of the invention, the intermediate support posts 37 are spaced from the ends of the container a distance "f" as shown in FIGS. 15 and 16, not greater than 25 percent of the container length "g".

Figure 14:
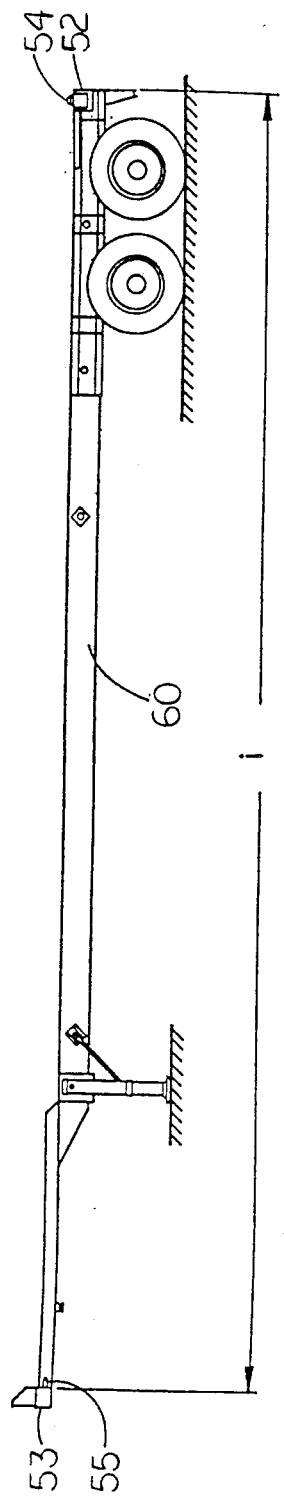
FIG. 14 is a side elevation of the side of the elongated container chassis fully assembled with tires.
Figure 18:
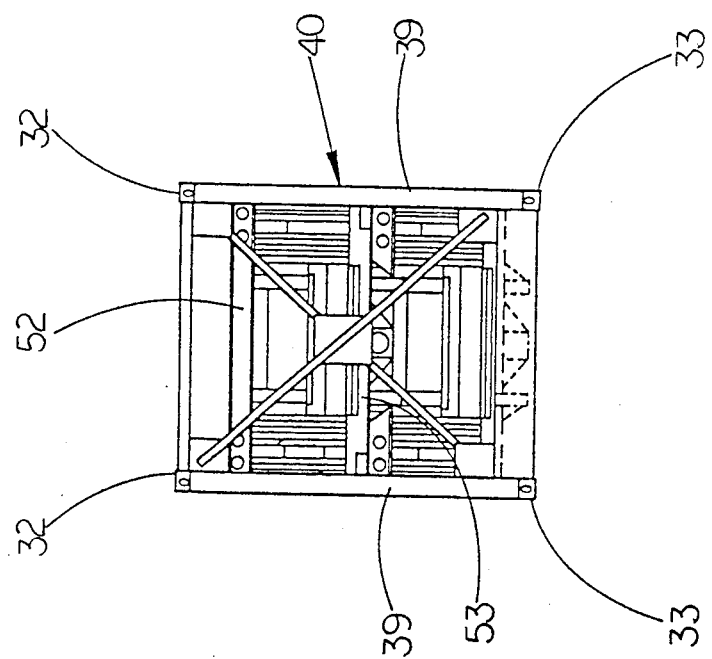
FIG. 18 is a rear elevation view of the rear endframe of the container with intermediate support points.
Figure 17:
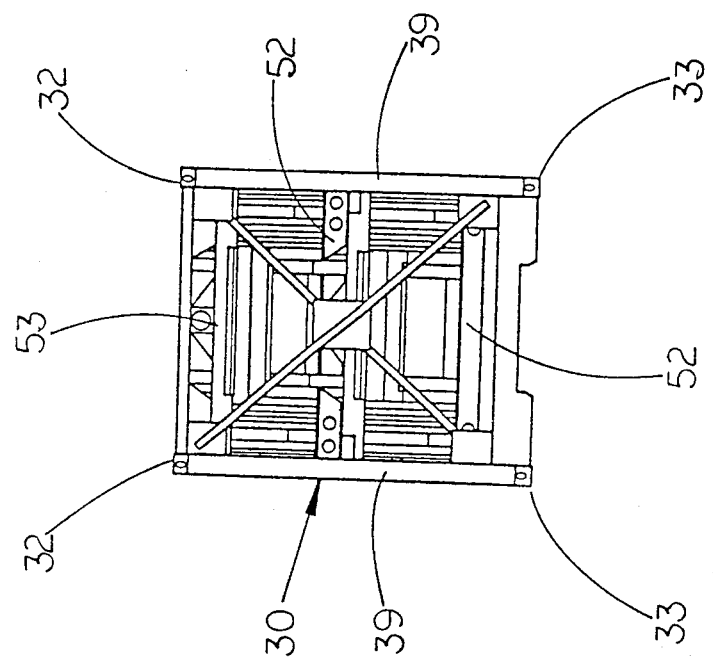
FIG. 17 is a front elevation view of the front endframe of the container with intermediate support points.

Referring to FIGS. 15 and 16, "e" represents the overall length of a conventional chassis, taken as the distance from the outside face of the front bolster 53, to the outside face of the rear bolster 52, which distance is generally greater than the overall length of the container(s) designated to be carried by the chassis. As shown in FIGS. 14 and 19, "i" represents the overall length of another chassis of a greater length, which chassis may be capable of carrying a container of either length "e" or "g", or both.

Referring to FIGS. 1, 2, 4; 9–13; 21, 22, and 26, "a" represents the overall length of a conventional chassis, for example 40 or 45 feet nominal, while "b" represents the distance which the rear bolster assembly 52, must be translated or slid forward and thereby effectively reduce the overall length of the chassis to a size "d" for shipment within the confines of another conventional length container of size "c", as for example 40 or 45 foot overall length.

Figures 23, 24:
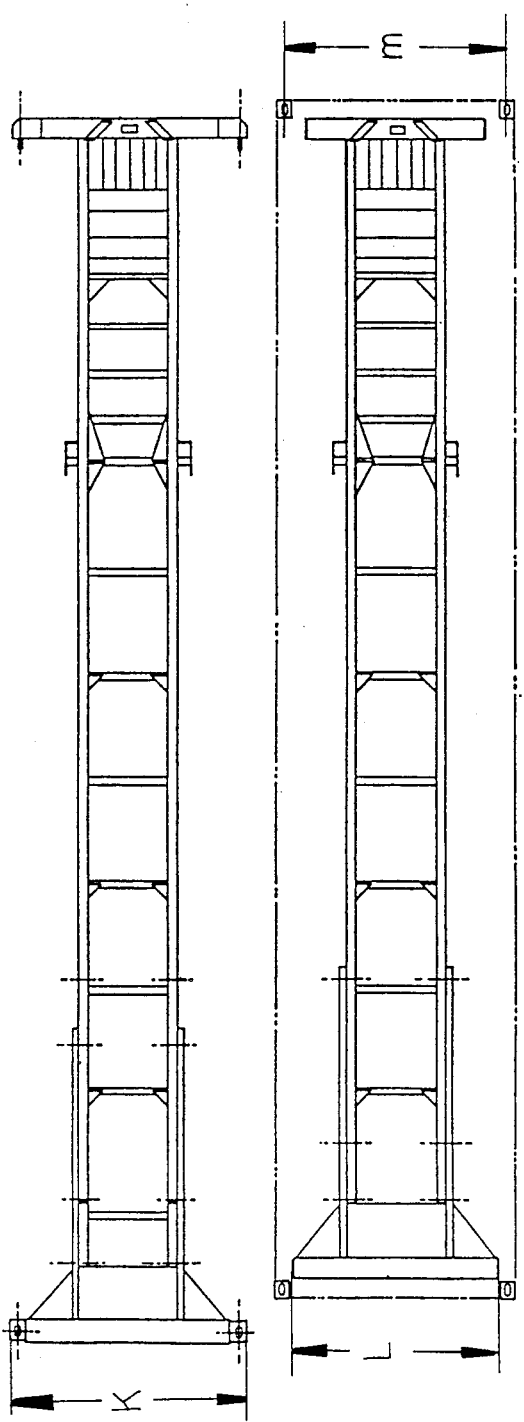
FIG. 23 is a top plan view of the container chassis skeletal steel frame with front and rear bolsters of conventional width.
FIG. 24 is a top plan view of the container chassis frame with rear twistlocks and front pin ends removed, positioned inside a conventional container for freight handling.
Figure 25:
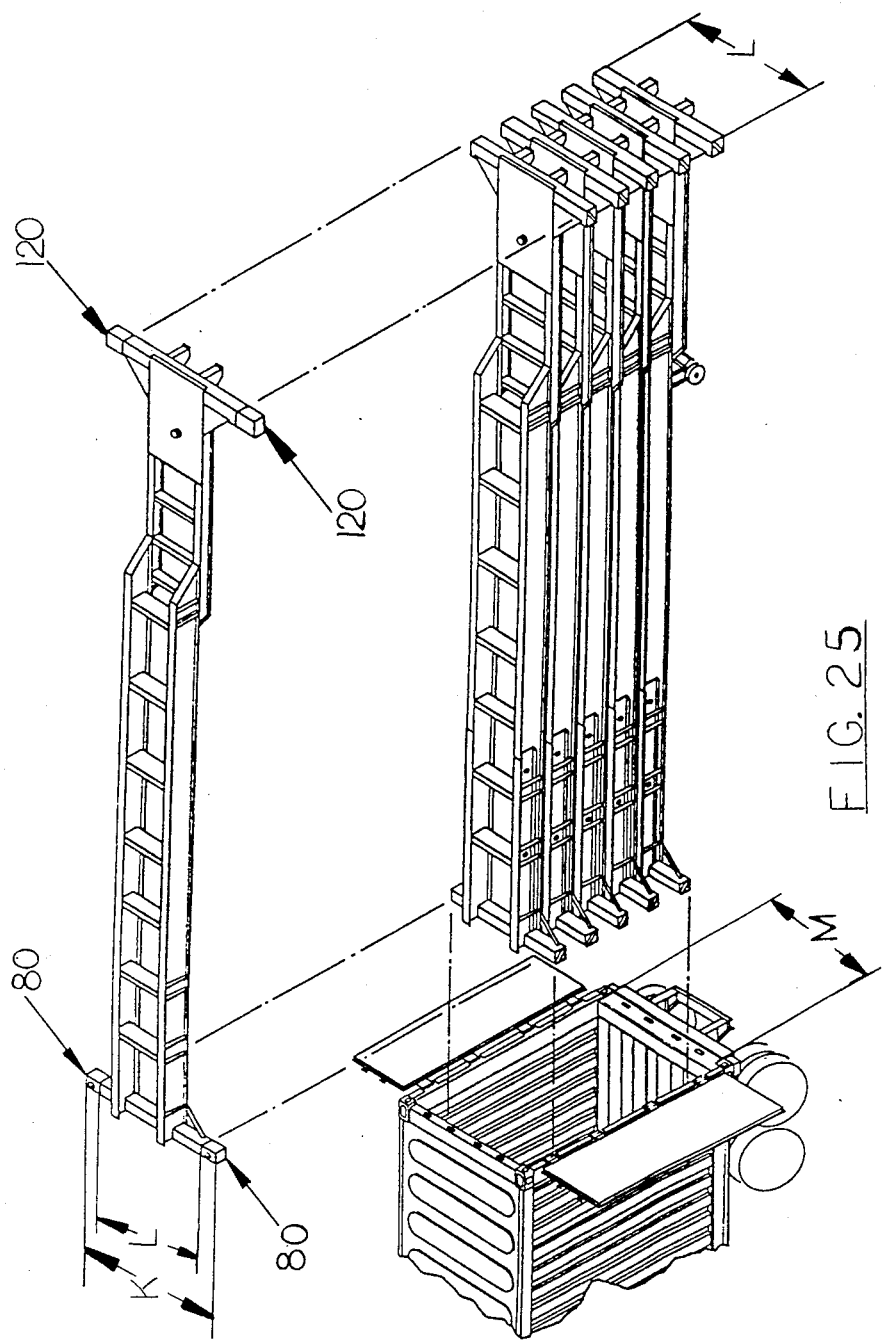
FIG. 25 is an isometric view of the stack of chassis frames with rear twistlocks and front pin ends removed for handling inside a conventional size container for freight handling with an exploded single chassis with rear twistlocks and front pin ends for comparison purposes.

In FIGS. 23, 24, and 25, "k" represents the overall width of a conventional chassis, for example 8 or 8½ feet, while "l" represents the reduced overall width required to fit the chassis within the confines of a conventional container, designated by the letter "m".

It is known that container chassis are designed in various types to provide various functions, for example chassis of a fixed overall length, chassis with translating (sliding) rear suspension and running gear, and chassis with either gooseneck shaped skeletal steel frames as shown, or straight frames, not shown. In the case of translating (slider type) chassis frames, by providing additional translation forward a distance "b", and securing the slider frame with releasable pins, bolts or other suitable means as designated by number 51, the overall length of the chassis is reduced for shipment within the confines of a conventional length container of size "c". In the case of fixed overall length chassis (non slider type), by providing for the translation of the rear bolster assembly 52 shown in FIGS. 7 and 8, the same reduction in overall length "b" can be obtained for negligible cost in fixed length chassis, using releasable pins, bolts or other suitable means as in 51. It is to be understood that while this invention does not show figures of straight frame chassis or platform trailers, and the invention relates specifically to the transport of container chassis, these and other types of equipment could be equally well adapted for shipment and stacking in mixed relation. Moreover, each variation of the invention for either chassis frames or fully assembled chassis with or without all tires installed can function equally well for fully assembled chassis or stacks of frames.

Figure 6:
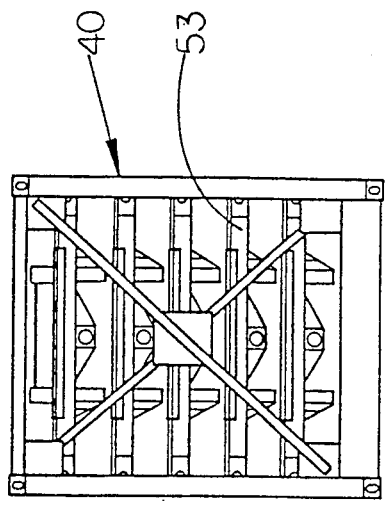
FIG. 6 is a rear elevational view of the rear endframe of the container of FIG. 1.
Figure 5:
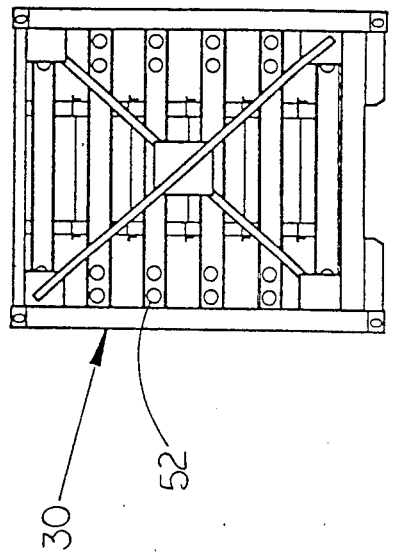
FIG. 5 is a front elevational view of the front endframe of the container of FIG. 1.
Figure 7:
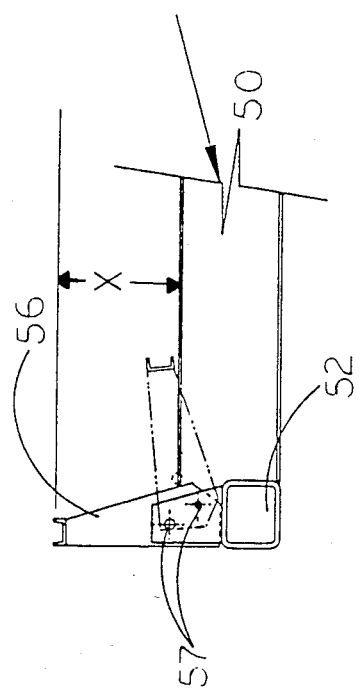
FIG. 7 is a enlarged side elevational view of the rear stepguard (ICC Bumpter) installation.
Figure 8:
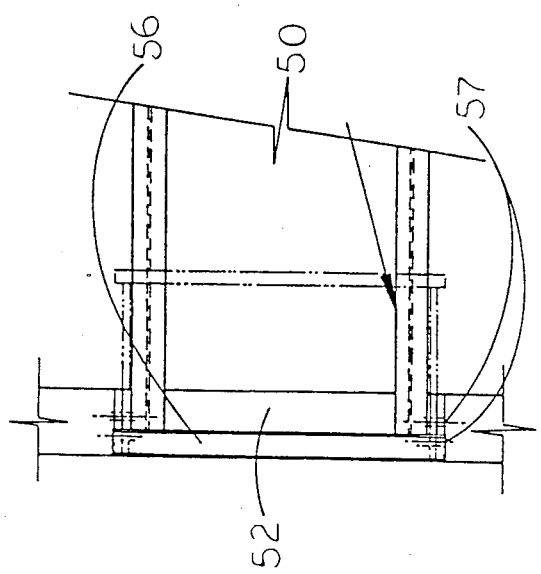
FIG. 8 is top plan view of the stepguard shown in FIG. 7.
Figure 9:
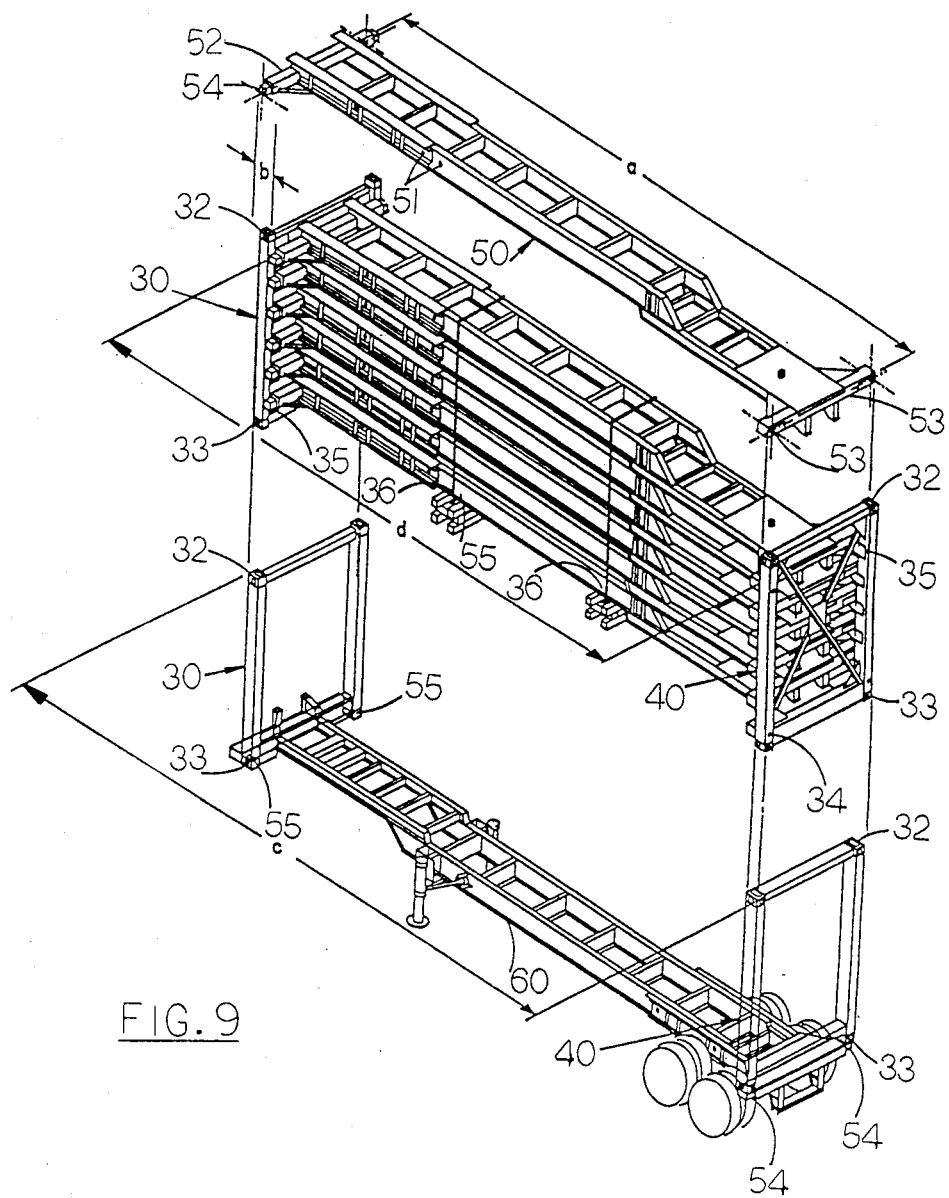
FIG. 9 is a perspective view of the invention with a chassis frame shown removed from the chassis frame stack and the chassis frame stack shown as removed from the fully assembled chassis with tires.

Referring to FIGS. 7 and 8, the rear stepguard ("ICC BUMPER") 56 of the chassis projects some conventional height "X" above the mainbeam of the chassis frame 50. By providing for the releasable attachment or detachment of, or the rotating position of the stepguard 56, the chassis may be stacked in a closer relation for more economical shipment. It is possible to rotate the stepguard about a hinge pin 57 and a lockpin 57 of equal or different diameter. Alternatively, the stepguard 56 can be removed and stowed for shipment by releasing the pins 57, bolts or other suitable means of securement.

The twistlocks may be removed as shown in FIGS. 24 and 25, thus reducing the overall width "k" of the rear bolster 52, allowing the chassis to be shipped within the confines of a conventional width container. The releasably attached twistlocks can be secured by a pin bolt or other suitable means not shown.

Moreover, by providing end plates at the rear and front bolster assemblies 52 and 53, the manufacturer of the chassis or chassis frame can provide rear twistlocks and front pins which can be installed on a variety of chassis user's design configurations for bolster assemblies. Additionally, the invention can be applied with rear twistlock and front pin assemblies for chassis of various overall widths, for example converting a conventional 8 foot width chassis to 8½ foot width.

The stacks of chassis and chassis frames 50 are tied together by providing wire rope and turn buckles 86 for tensioning. It is known that the skeletal steel frame of the chassis is constructed with sufficient strength to support both the static and dynamic forces imposed by a freight container. By providing for the securement of the frames 50 into a stack acting as a unit of attached, vertically spaced beams, the invention makes use of the load resisting properties of the freight to form a rigid three-dimensional structure coupled to endframe 30 and 40, capable of resisting normal service loads applied to conventional containers, and reducing the amount of deflection which would otherwise occur in a single frame not tied together in a stack and forming in effect the container.

From the foregoing, it has been shown that the present invention provides an effective and economical means to transport or reposition container chassis and other equipment of skeletal frame construction, making use of the structural properties of the freight to frame a freight handling container consisting of reusable, releasable front and rear endframe assemblies. The invention provides a container capable of being handled in successive overland and marine transportation, particularly with reference to freight boxes or containers adapted to be mounted on a highway truck-trailer chassis, railway flat cars and the like, whereby the container is free to be hoisted and stowed aboard ship. The container is capable of being interchangeably stacked between itself and standardized or conventional containers of variable lengths having support points at the corners or intermediate support points. The containers framed by the freight may be conveyed overland, transferred to a ship, and secured in position for marine transportation to a port of destination. When the destination is reached the containers may be transferred from the ship to a highway trailer chassis or railway flatcar, to be transferred thereby to the ultimate destination.

In another embodiment of the invention, the front bolster 53 and the rear bolster 52 have removable front pin end assemblies 120 and rear twistlock assemblies 80 which can be removed by means of a key and keyway assembly thus permitting a stack of chassis to be transported within the confines of a conventional container for freight handling, as for example a dry-van or open-top container, with all of the handling capabilities as outlined in the preceding paragraph.

It should be understood that the apparatus described above is not intended to limit the invention in any manner, nor is the invention limited to any one embodiment described. On the contrary, the invention is viewed as encompassing all alternatives, modifications and equivalents as may be included within the spirit and scope of the invention as defined by the following claims.

What is claimed is:

1. A chassis assembly for freight handling of truck-trailer chassis comprising; a plurality of truck-trailer chassis adaptable to be stacked and also adaptable to be framed for holding said stacked chassis, each chassis comprising a frame for supporting freight thereon, bolster assemblies mounted to the front and rear of said chassis frame, said rear bolster assembly being slidably mounted to said chassis frame and adapted to be able to slide forward to reduce the overall length of the chassis to fit within a container; a removable rear twist lock assembly mounted to the rear bolster assembly for reducing the width of the bolster assembly to fit the chassis within a container; end frames removably secured to each bolster assembly, said end frames comprising vertically disposed posts spaced from each other and interconnected by adjustable support members, said posts being adapted to be removably secured to said bolster assemblies, and including coupling means for facilitating coupling of said end frame to a lifting mechanism.

2. A chassis assembly for freight handling of truck-trailer chassis comprising:
   a plurality of truck-trailer chassis adaptable to be stacked and also adaptable to be framed to hold a stack of said truck-trailer chassis, each chassis comprising a frame for supporting freight thereon, bolster assemblies mounted to the front and rear of said chassis frame, said rear bolster assembly being slidably mounted to said chassis frame and adapted to be able to side to side to vary the overall length of the chassis, each said bolster assembly including removable coupling means for removably securing said bolster assembly to an end frame;
   said end frames comprising vertically disposed posts spaced from each other and interconnected by header bars, said posts defining upper and lower casting means to be removably secured to said bolster assemblies, for holding said chassis assemblies in relationship with a plurality of other chassis assemblies of the same and of different lengths, and for facilitating coupling of said end frame to a lifting mechanism.

3. Chassis assembly of claim 2, wherein said upper and lower casting means defines an oblong slot therein.

4. Chassis assembly of claim 2, wherein said upper and lower casting means defines a socket therein.

5. Chassis assembly of claim 2, wherein said chassis assembly further inclues a rear stepguard member.

6. A chassis assembly as claimed in claim 2, wherein said end frame posts include intermediate posts mounted longitudinally inward of the assembly ends.

7. Chassis assembly as claimed in claim 2 including end plate means mounted to said front and rear bolster assemblies.

8. Chassis assembly as claimed in claim 7 including removable rear twist lock means mounted to the end-plate means of rear bolster of said chassis frame and removable front pin assemblies mounted to the end plate means of the front bolster of said chassis frame.

9. Chassis assembly of claim 2, wherein said upper and lower casting means are constructed to allow a plurality of chassis assemblies to be mounted upon each other with the weight of an upper chassis assembly borne exclusively by the casting means of a lower chassis assembly.

10. Chassis assembly of claim 9 wherein said casting means define openings for the reception of connecting lugs.

11. Chassis assembly of claim 5, including a stepguard member rotatably mounted to said chassis frame.

12. Chassis assembly of claim 11, wherein said rotatable mounting comprises a hinge pin means and a lock pin means.

* * * * *